P. M. ORLOPP.
CLUTCH REGULATOR.
APPLICATION FILED MAR. 9, 1910.

982,088.

Patented Jan. 17, 1911.

2 SHEETS—SHEET 1.

WITNESSES:
G. H. Boink
O. M. McLaughlin

INVENTOR.
Piatt M. Orlopp.
BY
V. H. Lockwood
ATTORNEY.

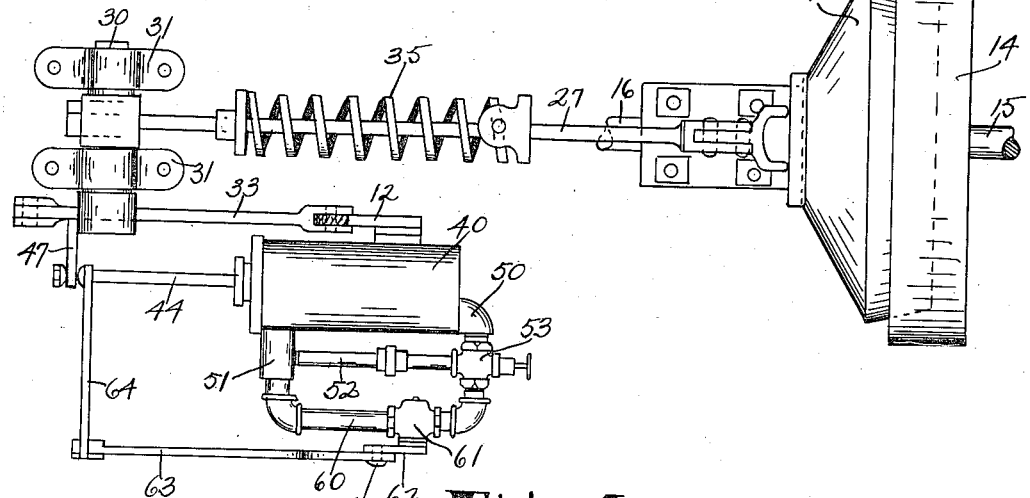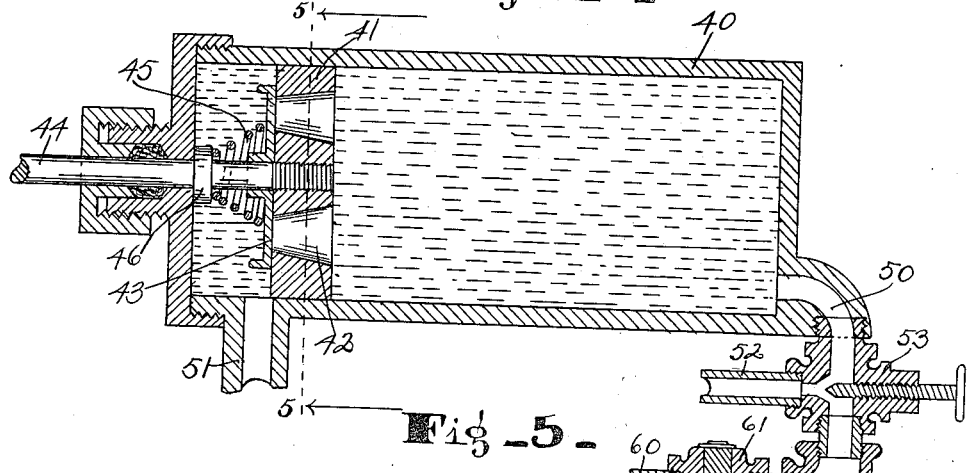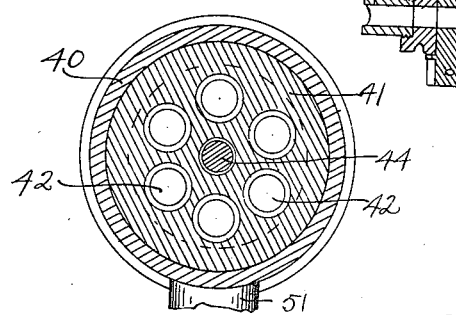

UNITED STATES PATENT OFFICE.

PIATT M. ORLOPP, OF INDIANAPOLIS, INDIANA.

CLUTCH-REGULATOR.

982,088.      Specification of Letters Patent.      Patented Jan. 17, 1911.

Application filed March 9, 1910. Serial No. 548,191.

*To all whom it may concern:*

Be it known that I, PIATT M. ORLOPP, of Indianapolis, county of Marion, and State of Indiana, have invented a certain new and useful Clutch-Regulator; and I do hereby declare that the following is a full, clear, and exact description thereof, reference being had to the accompanying drawings.

The object of this invention is to provide a clutch regulator for automobiles and other devices, which will, after the clutch members have been disengaged, cause the movable member thereof, during its return to have a rapid movement toward the other clutch member until it almost reaches the other clutch member, and thereafter to have a relatively slow closing movement. Heretofore devices of this kind have been provided which retarded the closing movement of the movable clutch member, under the action of a spring or like means, but that caused a relatively long closing movement, for the movable clutch member moved as slowly during the entire return movement thereof as it did at the very end of its closing movement, whereas the only time when a slow return movement is necessary is just as the movable member is coming into engagement with the other member. With this invention all excepting the latter part of the return movement will be rapid and thus the clutch be very quickly returned and yet retarded at the very last movement so as to avoid the shock of a sudden engagement of the two clutch members.

Figure 1:
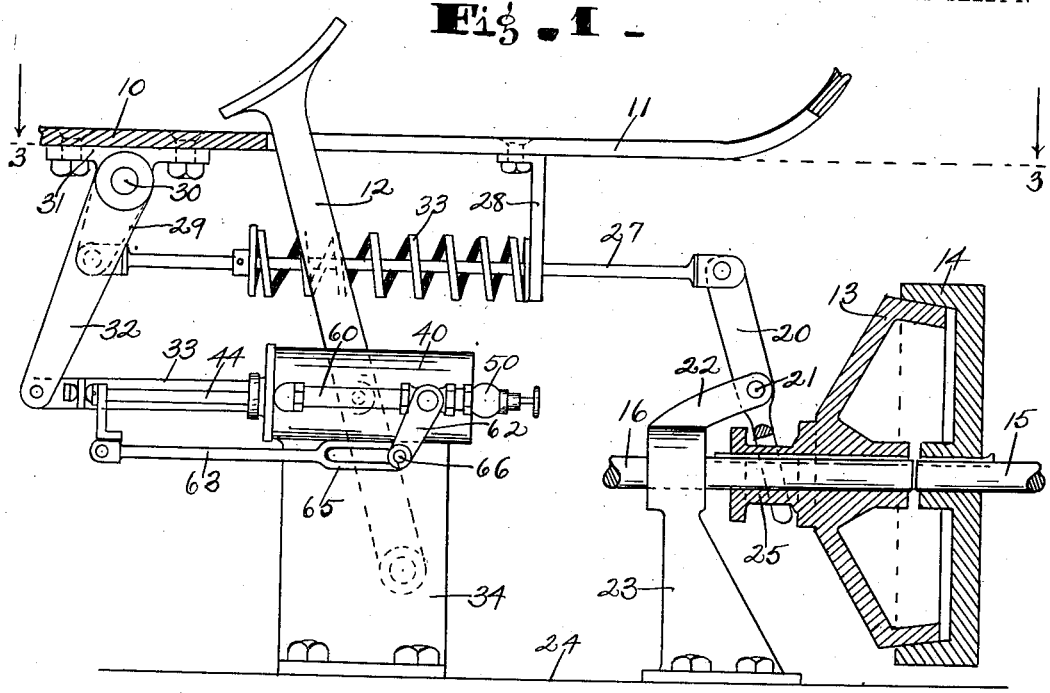
Figure 2:
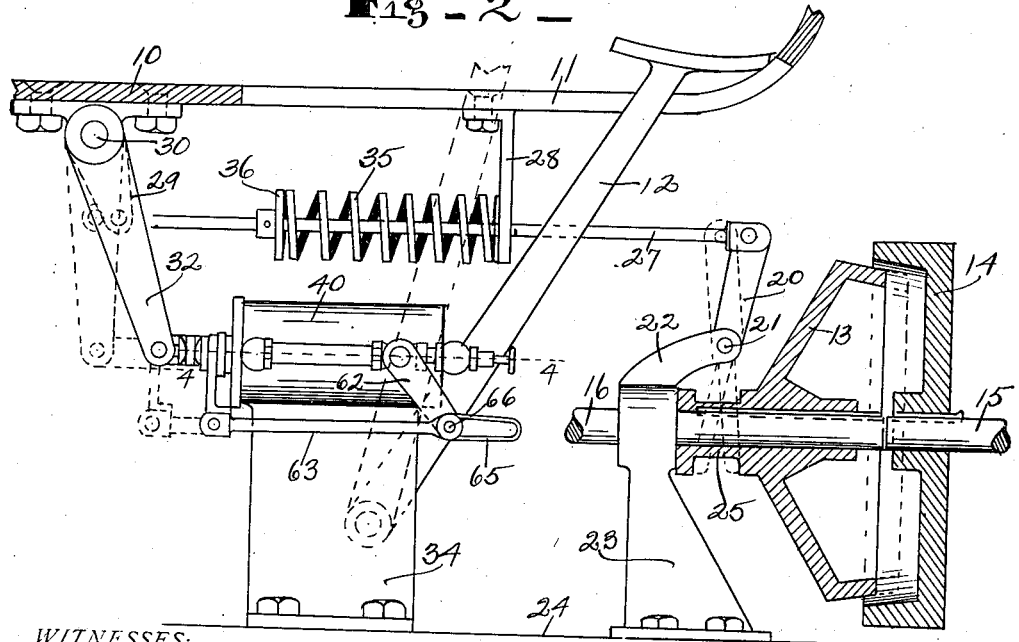

The nature of the invention will be understood from the accompanying drawings and the following description and claims:

In the drawings, Figure 1 is a central vertical section through a portion of the bottom of an automobile bed and a part of the mechanism below showing mechanism herein involved with the clutch in normal closed engaging condition. Fig. 2 is the same showing the parts while the clutch members are disengaged. Fig. 3 is a horizontal section on the line 3—3 of Fig. 1 showing the parts in plan view. Fig. 4 is a central longitudinal vertical section through the retarding cylinder and associated parts on the line 4—4 of Fig. 2. Fig. 5 is a cross section on the line 5—5 of Fig. 4.

There is shown herein the bottom 10 of a bed or body of an automobile near the front end thereof, with a longitudinal slot 11, through which the pedal lever 12 extends, whereby the engagement of the clutch members 13 and 14 is regulated. The fixed clutch member 14 is secured on the shaft 15, and the other clutch member 13 splined so as to be slidable on the shaft 16. Any type of friction clutch may be used in this invention.

The removable clutch member 13 is disengaged from the fixed clutch member by the following means: A yoke lever 20 is fulcrumed at 21 in an arm 22 in the stand 23 connected with some part of the frame 24 of the automobile. The lower end of the lever 20 is yoked to loosely engage the reduced portion 25 of the clutch member 13 so as to move it from the position shown in Fig. 1 to that shown in Fig. 2. The connecting rod 27 is pivoted at the upper end of the lever 20 and passes through the guide 28 extending down from the bottom of the vehicle bed and at its other end is pivoted to a short crank 29 secured on the rod 30 fulcrumed in the bearings 31 on the underside of the bed of the vehicle. A longer crank 32 is also secured to said rod and extends downwardly and at its lower end it is pivoted to a horizontal bar 33 which in turn is pivoted to the lever 12 between the ends thereof. The pedal lever 12 is fulcrumed at its lower end to the stand 34 on the frame 24. Therefore, when the pedal lever is pushed forwardly to the position shown in Fig. 2, the clutch members will be disengaged. When, however, the pedal lever is released, the reëngagement of the clutch members is caused by the spiral spring 35, which surrounds the rod 27 and lies between the arm 28 and the disk 36, which is secured to said rod and thus tends to return said parts to their normal position, as shown in Fig. 1.

The foregoing describes a rather common type of clutch mechanism, but it is not desired to limit this invention to any particular type of clutch mechanism, as it is applicable equally to any clutch mechanism wherein the movable clutch member is returned to the engaging position by a spring or other means.

The invention herein relates to the means for controlling or regulating the return movement of the clutch member 13. Upon the stand 34 there is a cylinder 40 filled with some liquid and in it the piston 41 operates with ports 42 extending through it which are preferably conical with the outer ends closed by a valve 43 slidable on the piston rod 44 and actuated by a spring 45 lying between said valve 43 and a disk 46 secured on the piston rod. The piston rod 44, as shown in Fig. 3, is connected by the arm 47 with the bar 33. The parts are in their normal position as shown in Fig. 4 and when the pedal lever is pushed from the position shown in Fig. 4 to that shown in Fig. 2 the piston rather freely goes to the right from the position shown in Fig. 4 to the end of the cylinder, for in that movement the valve 43 yields and opens the ports 42. But the piston tends to resist and retard the return movement of the clutch member 13 under the action of the spring 35.

A by-pass from one end of the cylinder 40 to the other is formed through the nozzles 50 and 51 and the tube 52 connecting them, and this by-pass is controlled by the valve 53. Hence by regulating the valve 53 the retarding movement of the piston 41 can be modified or regulated as the back stroke of the piston is only permitted by the passage of the fluid through the by-pass and the smaller that passage the slower will be the return movement of the clutch member.

With the foregoing regulating arrangement it is observed that there would be a uniform retardation of the return movement of the clutch member 13. To accelerate such return movement of the clutch 13 during the first portion of such movement I provide an additional by-pass 60 from the nozzles 50 and 51. It has a valve 61 for controlling the passage of the fluid independently of the other by-pass. This valve is controlled by the small crank 62 secured to the valve for turning it, a connecting rod 63 extending from said crank to the bar 64 which is secured to the piston rod 44. The rod 63 has a slot 65 in it through which the pin 66 from the crank 62 loosely projects, as shown in Fig. 1. Therefore, assuming the parts to be in the position shown in Fig. 2, when the foot is removed from the pedal 12, the spring will cause the return of the clutch member 13, and also the piston 41 by the action of the spring 35, will be very slightly resisted by this regulator at first because the fluid can make the circuit freely through the two by-passes, the combined passageway for the fluid being large enough to cause the fluid to move with relative rapidity through them. This rapid return movement of the clutch member 13 continues while the rod 63 is being moved from the full line position shown in Fig. 2 to the dotted line position shown therein, and then, the slotted portion of the rod 63 having passed over the pin 66, said rod 63 begins to operate and close the valve 61 in the second by-pass 60, and that movement of the valve 61 begins at once to gradually reduce the extent of the passageway for the fluid in the cylinder 40, and when the valve 61 is closed the only passageway for the fluid in the cylinder 40 is through the by-pass 52. This relatively rapid return movement of the clutch member 13, therefore, permits it to reach the fixed clutch member quickly and then the ultimate engagement with the fixed clutch member is relatively slow, as the fluid from the cylinder passes through only one of the by-passes, and thereby the sudden engagement of the clutch members and the consequent shock and strain on the power transmission mechanism are avoided.

I do not wish to be limited to the details of the means herein shown for varying the action of the regulator during the engaging movement of the movable clutch, for it is immaterial how many by-passes are used, whether one or a great many, or whether they are connected with each other as herein shown or are independent of each other, so long as the capacity of the total by-pass area is reduced automatically by the movable clutch and its connections near the end of the engaging movement of said clutch member.

The word "by-pass" in the claims is therein used to cover a single passageway or an aggregation of passageways which cooperate so as to constitute practically one by-pass.

What I claim as my invention and desire to secure by Letters Patent is:

1. In a clutch mechanism the combination with a movable clutch member, a fixed clutch member, means for moving the movable clutch member into engagement with the fixed clutch member, and means for retarding such movement of the movable clutch member toward the fixed clutch member, of means for hastening the movement of the movable clutch member until near the end of its engaging movement toward the fixed clutch member.

2. In a clutch mechanism, the combination with a movable clutch member, a fixed clutch member, a spring for giving the movable clutch member its return or engaging movement after it has been disengaged from the fixed clutch member, and means for resisting the action of said spring, of means for increasing the resistance to the action of said spring near the end of the engaging movement toward the fixed clutch member.

3. In a clutch mechanism, the combination with a movable clutch member, a fixed clutch member, and a fluid controlled means for retarding the engaging movement of the movable clutch member and which has a by-pass for the movement of the fluid therein, of means controlled by the engaging movement of the clutch for reducing the area of the by-pass when said clutch member is near its clutch engaging position.

4. In a clutch mechanism, the combination with a movable clutch member, a fixed clutch member, a cylinder filled with a liquid and having a suitable by-pass connecting the two ends of said cylinder, a piston in said cylinder, and a connection between said piston and the movable clutch member, of means controlled by the engaging movement of the clutch for reducing the area of the by-pass when said clutch member is near its clutch engaging position.

5. In a clutch mechanism, the combination with a movable clutch member, a fixed clutch member, a cylinder containing fluid, a plurality of by-passes connecting the ends of the cylinder, a piston operating in said cylinder, a piston rod, and a connection between the piston rod and the movable clutch member, of a valve for closing one of said by-passes, a connection between said valve and the piston rod arranged so that the movement of the piston rod caused by the engaging movement of the movable clutch member will cause said valve to be closed near the end of such engaging movement.

6. In a clutch mechanism, the combination with a movable clutch member, a fixed clutch member, a cylinder containing fluid, a plurality of by-passes connecting the ends of the cylinder, a piston operating in said cylinder, a piston rod, and a connection between the piston rod and the movable clutch member, of a valve for closing one of said by-passes, a crank for closing said valve, a connecting bar having a slotted connection with said valve crank so that during a portion of the movement of said bar it will not actuate said valve, and means for connecting said connecting bar with the piston rod.

In witness whereof, I have hereunto affixed my signature in the presence of the witnesses herein named.

PIATT M. ORLOPP.

Witnesses:
G. H. BOINK,
O. M. MCLAUGHLIN.